(12) United States Patent
Ikeda et al.

(10) Patent No.: US 7,460,885 B2
(45) Date of Patent: *Dec. 2, 2008

(54) MOBILE TELEPHONE

(75) Inventors: Minoru Ikeda, Inagi (JP); Yoshihiro Iwama, Kokubunji (JP); Yuichiro Kota, Tokyo (JP); Kazuo Shimoyamada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 471 days.

This patent is subject to a terminal disclaimer.

(21) Appl. No.: 11/218,602

(22) Filed: Sep. 6, 2005

(65) Prior Publication Data

US 2005/0287953 A1    Dec. 29, 2005

Related U.S. Application Data

(63) Continuation of application No. 10/372,775, filed on Feb. 26, 2003, now Pat. No. 6,957,083.

(30) Foreign Application Priority Data

Sep. 20, 2002   (JP) .............................. 2002-274283

(51) Int. Cl.
*H04M 1/00* (2006.01)
(52) U.S. Cl. ................. 455/556.1; 455/575.3; 455/66.1
(58) Field of Classification Search .............. 455/556.1, 455/566, 403, 550, 575.3, 66.1, 556, 90, 455/414.1; 345/601, 602; 348/14.02, 375, 348/333.06, 14.2
See application file for complete search history.

(56) References Cited

U.S. PATENT DOCUMENTS 6,957,083 B2 * 10/2005 Ikeda et al. .............. 455/556.1
2002/0142810 A1   10/2002 Kawasaki et al. ........... 455/566

(Continued)

FOREIGN PATENT DOCUMENTS

JP              06141306           5/1994

(Continued)

OTHER PUBLICATIONS

"Mova SH251i User's Manual: Functional Description," NTT DoCoMo Group, Jul. 2002, 3rd Edition. pp. 6-9 and 140-146.

(Continued)

*Primary Examiner*—Tan Trinh
(74) *Attorney, Agent, or Firm*—Mattingly, Stanger, Malur & Brundidge, P.C.

(57) ABSTRACT

A mobile telephone in which a camera portion is rotatably provided in a coupling portion for rotatably coupling a first casing and a second casing to each other, and a main display part and a manipulating part are provided in a casing surface and is hidden when the first and second casings are closed relative to each other. A sub-display part and an image pick-up button are provided in a surface of the first casing and are always exposed. A switch is provided for changing over the display condition of the sub-display part between a camera mode and an equipment status display mode, whereby the image pick-up by the camera portion can be simply carried out with no affect resulting from any folding motion of the casings.

4 Claims, 12 Drawing Sheets

U.S. PATENT DOCUMENTS

| | | | |
|---|---|---|---|
| 2002/0187818 A1* | 12/2002 | Kang | 455/575 |
| 2004/0166829 A1* | 8/2004 | Nakae et al. | 455/403 |
| 2004/0198476 A1* | 10/2004 | Aikawa et al. | 455/575.3 |
| 2007/0173292 A1* | 7/2007 | Sawayama et al. | 455/566 |

FOREIGN PATENT DOCUMENTS

| | | |
|---|---|---|
| JP | 10065780 | 3/1998 |
| JP | 11069214 | 3/1999 |
| JP | 2000253113 | 9/2000 |
| JP | 2000253124 | 9/2000 |
| JP | 2001186396 | 7/2001 |
| JP | 2001320463 | 11/2001 |
| JP | 2002111834 | 4/2002 |
| KR | 20030037052 | 5/2003 |

OTHER PUBLICATIONS

"Finally Released! First Release "SH251i" of Camera-Mounted I-Mode Mobile Phone", [online], May 27, 2002, Mainichi Communications Inc., [retrieved on Oct. 18, 2004], Internet <URL: http://pcweb.mycom.co.jp/articles/2002/05/27/sh251i>.

"Mova D251i User's Manual: Functional Description", NTT DoCoMo Group, Jun. 2002, 1st Edition, p. 6, 7, 108-110, 140-142.

* cited by examiner

FIRST CONDITION

SECOND CONDITION

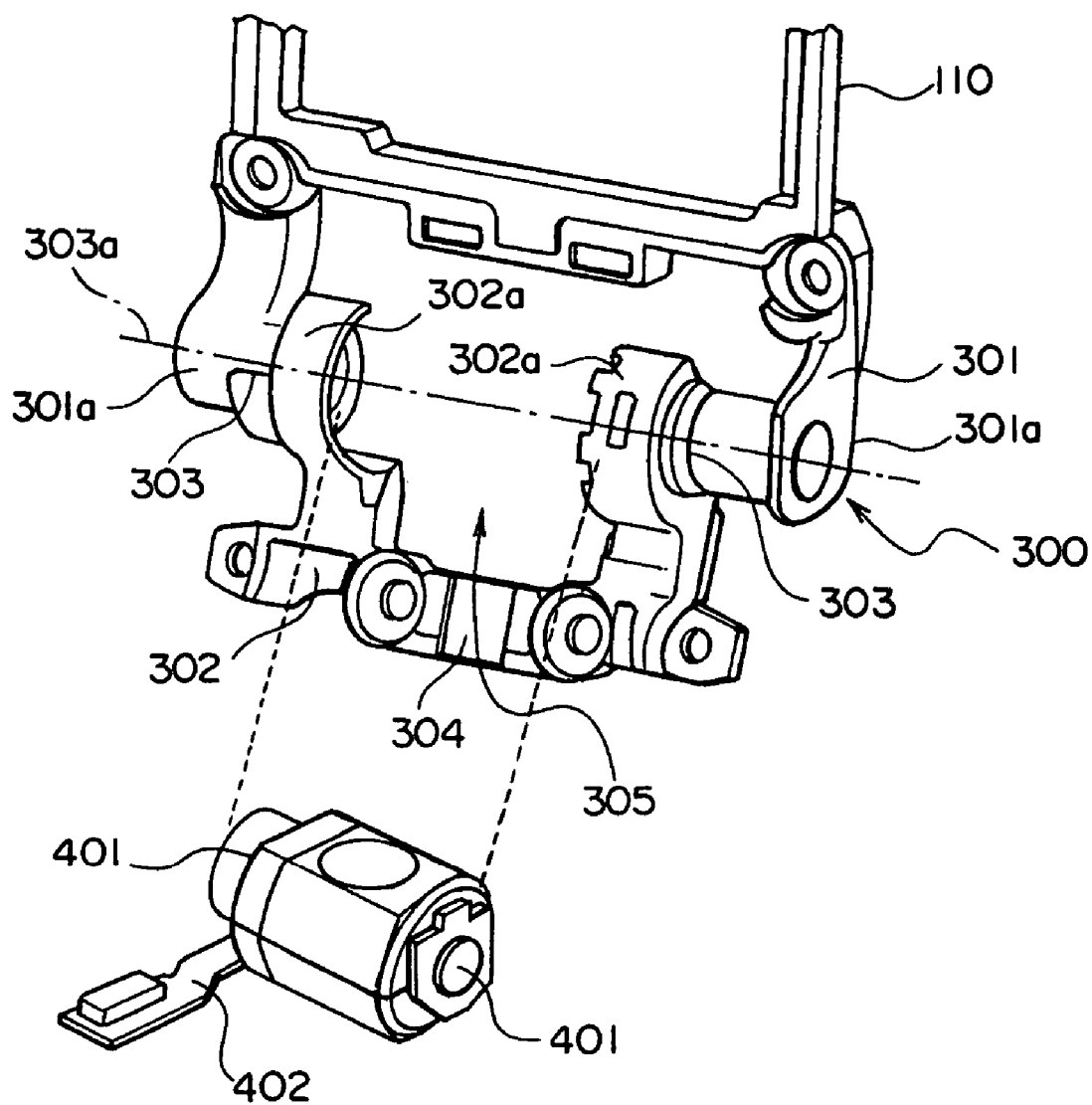

FIG. 7a
FIG. 7b
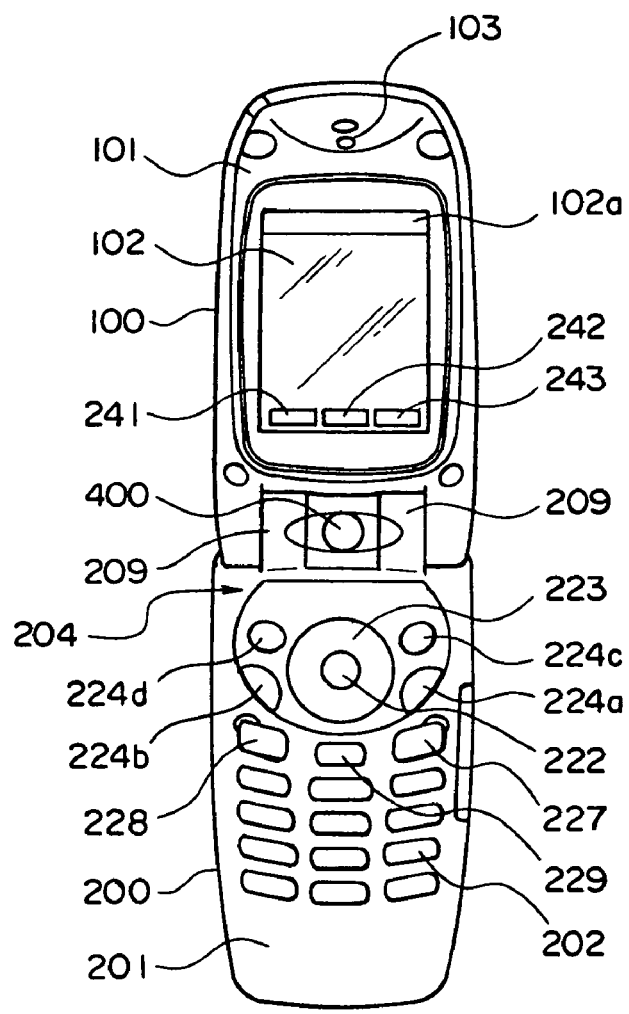
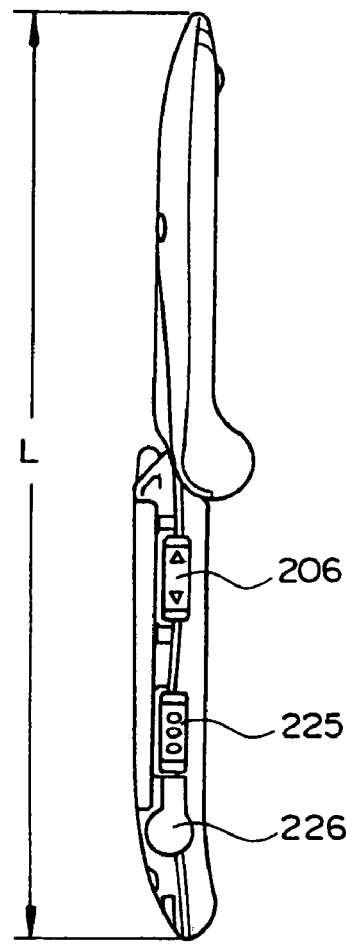

MOBILE TELEPHONE

The present application is continuation of application Ser. No. 10/372,775, filed Feb. 26, 2003, now U.S. Pat. No. 6,957,083, the contents of which are incorporated herein by reference.

BACKGROUND OF THE INVENTION

The present invention relates to a mobile telephone incorporating a camera function, and in particular to a mobile telephone having a body composed of two casings and a coupling portion with which the two casings are foldable, and in which a cameral portion is rotatably incorporated.

RELATED ART

These years, foldable mobile telephones each having two casings which are foldable by means of a coupling portion have been prosperously used. Meanwhile, these portable phones having a camera function capable of transmitting a picked-up image through a transmission facility attract public attention.

In particular, there may be used a portable phone in which a camera function is incorporated in the coupling portion in order to enhance the shooting posture. There have been proposed various technologies relating to the portable phone incorporating a camera function in the coupling part, such as a portable phone (a first prior art example) having a coupling portion composed of a pair of coupling mechanisms between which a camera portion is rotatably provided, a portable phone (a second prior art example) having a coupling portion which is eccentrically biased to one side so as to incorporate, on the other side, a camera portion rotatably provided to the coupling part, as disclosed in JP-A-6-141306, JP-A-69214 and JP-A-2000-253124.

As in the prior art examples, since the camera portion is rotatably mounted to the coupling portion, the cameral portion can be easily set to a suitable angle. For example, in the above-mentioned first prior art example, the center position of the camera portion can be set to the center of opening angle of the two casings. Further, in the second prior art example, the center of the camera portion can be rotated toward a side remote from the front surface of the opened two casings, and accordingly, an image can be easily picked up from the user himself or a landscape.

However, either the above-mentioned first or second prior art example is adapted to pick up an image by the camera portion in such a condition that the two casings are opened from each other, and further, compactness and portability are taken into account in such a condition that the two casings are closed to each other. Thus, in the above-mentioned prior art examples, the two casings should be opened whenever an image is picked up.

BRIEF SUMMARY OF THE INVENTION

Accordingly, an object of the present invention is to provide a mobile telephone which can facilitate an image pick-up by a camera portion with no affection by folding action of casings.

To the end, according to the present invention, there is provided a mobile telephone comprising a body housing having a first casing and a second casing which are rotatably coupled with each other through the intermediary of a coupling portion, a camera portion mounted to the body housing, a mode change-over switch for changing over operation between a talking mode and an image pick-up mode, and a setting key, the first casing and the second casing of the body housing which are coupled to each other through the intermediary of the coupling portion being set in two conditions, that is, a first condition in which the first casing and the second casing are opened from each other and a second condition in which the first casing and the second casing are folded onto each other, the first casing incorporating a main display part in a surface which is exposed in the first condition but is hidden in the second condition, and a subdisplay part in a surface which is exposed in the second condition, said second casing incorporating a manipulating part in a surface which is exposed in the first condition but which is hidden in the second condition, in an image pick-up mode, an image picked up by the camera portion being displayed on the main display part in the first condition but on the subdisplay part in the second condition, the setting key being arranged in a surface which is exposed in the second condition, and being set as an image pick-up manipulation key in the image pick-up key, but as a change-over manipulation key for changing over images on the subdisplay part in a talking mode.

Further, to the end, according to the present invention, there is provided a mobile telephone comprising a body housing having a first casing and a second casing which are rotatably coupled with each other through the intermediary of a coupling portion, and a camera portion rotatably provided to the coupling portion, the first casing and the second caring being set into two conditions, that is, a first condition in which the first casing and the second casing are opened from each other and a second condition in which the first casing and the second casing are closed to each other, the first casing incorporating a main display part arranged at least in an inner surface thereof, a subdisplay part arranged in an outer surface thereof and a pair of optional setting keys capable of setting an arbitrary function in the second condition, the second casing incorporating a manipulating part and a switch for changing over modes of the body housing so that a display state of the main display part in the first condition is changed over from a talking mode into an image pick-up mode, and a display state of the subdisplay mode in the second condition is changed from an equipment condition display mode into the image pick-up mode, the manipulating part incorporating a first image pick-up button for carrying out an image pick-up at least in the first condition, and one of the pair of setting keys being adapted to be set as an image pick-up button which can be manipulated in such a condition that the body housing is in the image pick-up mode.

Other objects, features and advantages of the invention will become apparent from the following description of the embodiments of the invention taken in conjunction with the accompanying drawings.

BRIEF DESCRIPTION OF SEVERAL VIEWS OF THE DRAWING

FIG. 5 is an enlarged perspective view illustrating a coupling portion in the mobile telephone in the first embodiment of the present invention;

FIGS. 6a to 6e are external views illustrating the mobile telephone in the first embodiment of the present invention in a second condition, in which FIG. 6a is a plan view, FIG. 6b a front view, FIG. 6c a right side view, FIG. 6d a rear view and FIG. 6e a bottom view;

FIGS. 7a and 7b are external views illustrating the mobile telephone in the first condition, in which FIG. 7a is a front view and FIG. 7b a left side view;

FIGS. 9a and 9b are view for explaining a camera portion in the second condition of the first embodiment of the present invention, in which FIG. 9a is a rear view and FIG. 9b is a partially sectioned left side view;

FIGS. 10a and 10b are views for explaining an image pick-up holding posture of the camera portion of the mobile telephone in the first embodiment of the present invention, in which FIG. 10a shows an image pick-up holding posture in the first condition, and FIG. 10b is an image pick-up holding posture in the second condition;

FIGS. 11a and 11b are external views illustrating a mobile telephone in a second embodiment of the present invention, in which FIG. 11a is a perspective view in the first condition, and FIG. 11b is a perspective view in the second condition.

DESCRIPTION OF THE PREFERRED EMBODIMENTS

Figure 11A:
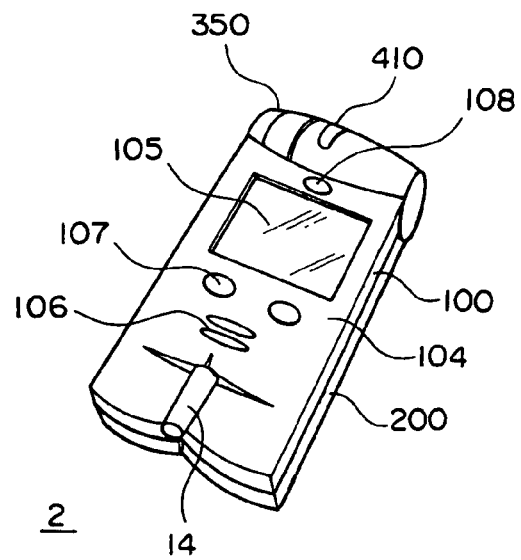
Figure 11B:
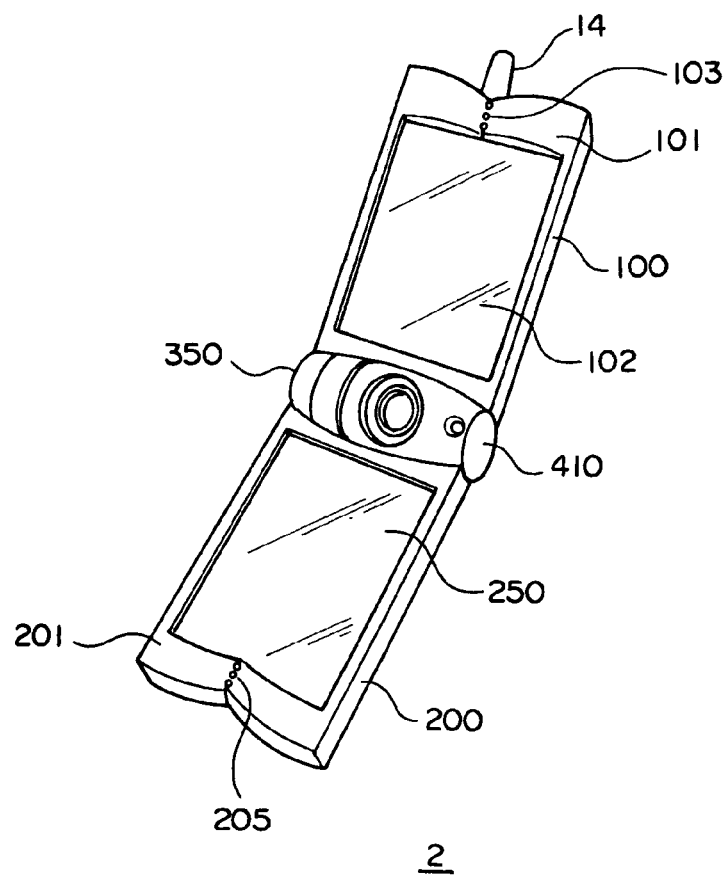
Figure 12:
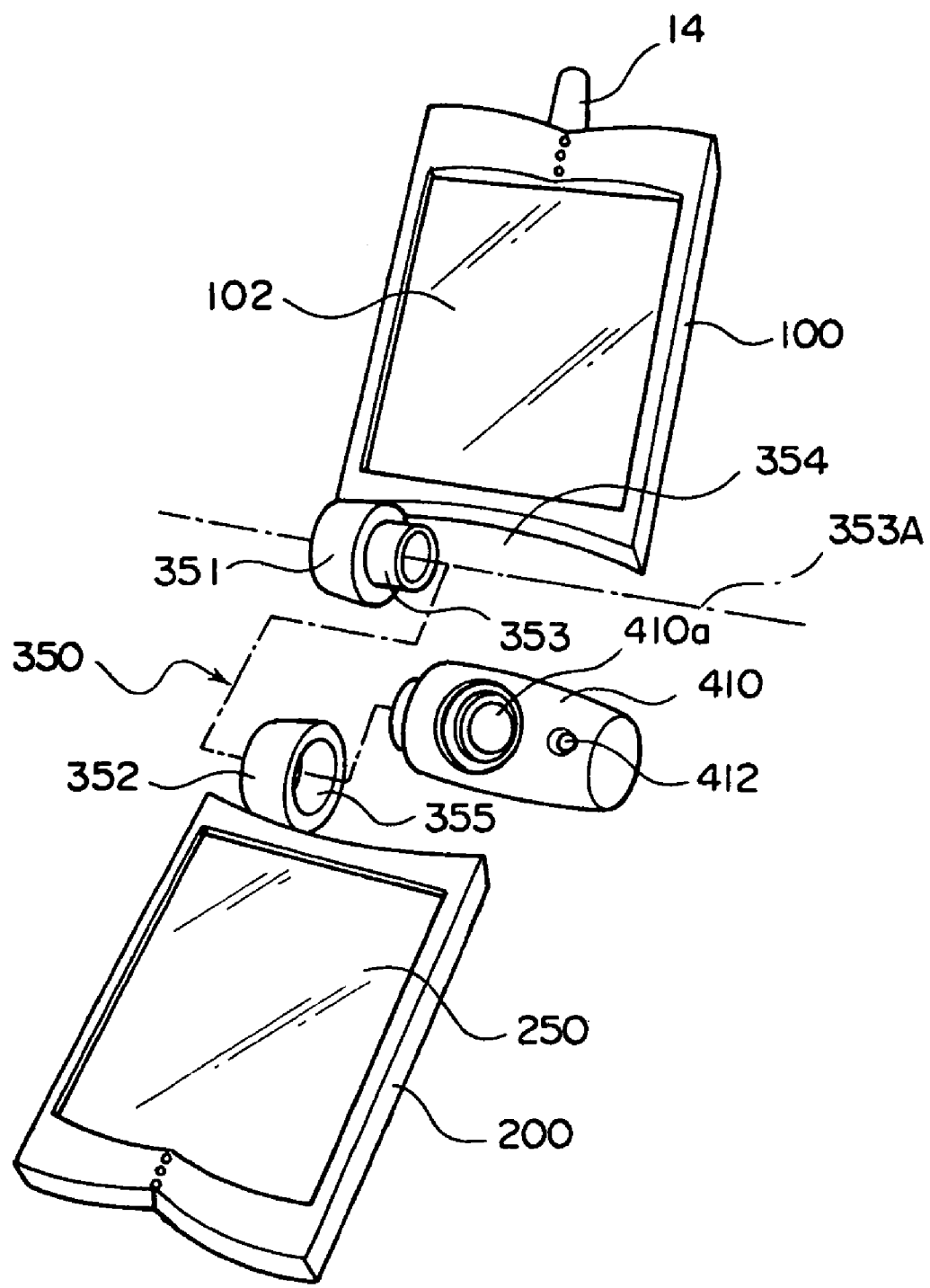
FIG. 12 is a view illustrating a configuration of parts of a mobile telephone.

Detail explanation will be made of embodiments of a mobile telephone according to the present invention with reference to FIGS. 1 to 12 in which FIGS. 1 to 10 show a first embodiment of the present invention while FIGS. 11 to 12 show a second embodiment of the present invention. Like reference numerals will be used to denote like parts, functions, and the like throughout the explanation in order to omit duplicate explanation.

First Embodiment

At first, brief explanation will be made of a configuration of a mobile telephone according to a first embodiment of the present invention with reference to FIG. 1 which is an external perspective view illustrating the mobile telephone in the first embodiment. Referring to FIG. 1, the mobile telephone which is denoted in general by reference numeral 1 incorporating a camera function which is mainly composed of a first casing 100 mainly incorporating a display function, a second casing 200 mainly incorporating a control function, a manipulating function and a battery, a coupling portion 300 for foldably coupling both casings, and a camera portion 400 rotatably mounted to the coupling portion 300.

Both first casing 100 and second casing 200 have flat external shapes and sizes so that they are superposed with each other when they are folded together. Further, they are coupled at their longitudinal one end by means of the coupling portion 300, and accordingly, they define an elongated configuration which is suitable for a talking posture (which will be hereinbelow referred to a first condition) when they are opened from each other while they define a configuration which can be held by one hand at longitudinally one end part thereof so as to be excellent in portability so that a posture satisfactory for an image pick-up (which will be hereinblow referred to as a second condition) can be taken when they are closed to each other.

Figure 1A:
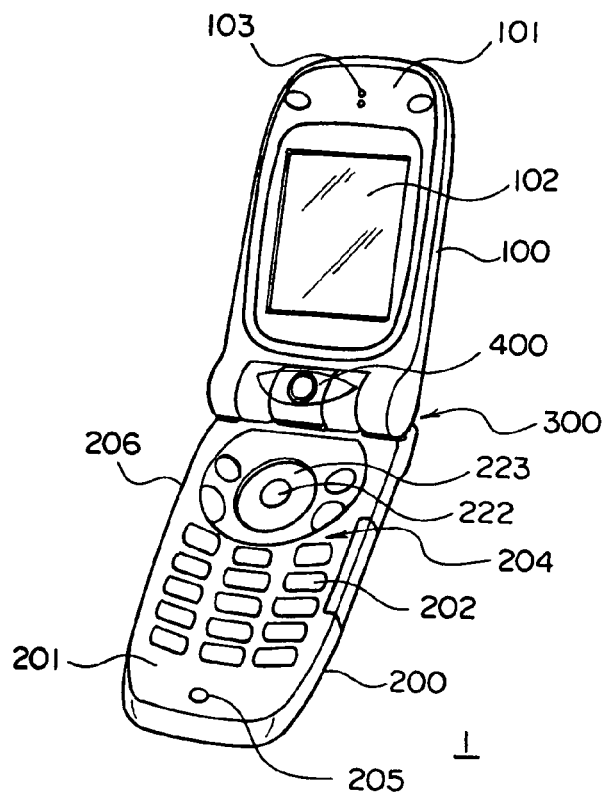
FIG. 1a and FIG. 1b which are external perspective views illustrating a mobile telephone in a first embodiment of the present invention, in an open condition shown in FIG. 1a and in a close condition shown in FIG. 1b.
Figure 1B:
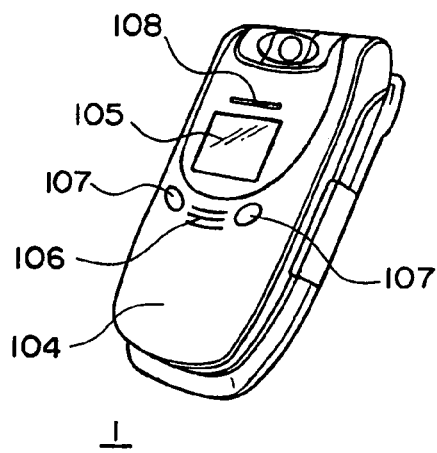

Referring to FIGS. 1a and 1b, in which FIG. 1a is a condition in which the two casings are opened from each other, and FIG. 1b shows a condition in which two casings are closed to each other, in this embodiment, a main display part 102 is provided in an inner surface 101 of the first casing 100 which is hidden in the second condition, and a manipulating part 204 composed of several manipulation keys including ten keys 202, a cursor shift key 223 and an enter key are provided in an inner surface 201 of the second casing which is hidden in the second condition. Further, a first speaker part 103 and a microphone part 2005 are provided in the two inner surfaces on the end part sides which are remote from the coupling portion 300 therebetween. Thus, since the first speaker part 103 and the microphone part 205 are located on the longitudinal both end sides of the casings, being adapted to the length between the mouth and one of the ears of the user, and accordingly, a satisfactory talking posture can be taken.

Meanwhile, a subdisplay part 105, a second speaker part 106, an option setting key part 107 and a status lamp part 107 are arranged in an outer surface 104 of the first casing 100 on the side remote from the inner surface 101. In this embodiment, there is incorporated an internal change-over switch 22 (refer to FIG. 2) for changing over signals through opening and closing operation of the coupling portion 300. By means of the internal change-over switch 22, the subdisplay part 105, the second speaker part 106, the option setting key part 107 and the status lamp part 108 provided in the outer surface of the first casing 100 can be set to be inoperative in the first condition, but can be set to be operative in the second condition.

Further, a mode change-over switch 206 for changing over the operation between a talking mode and an image pick-up mode is provided in a side surface of the second housing 200 which is exposed even in the second condition. In this embodiment, either of a still image mode and an animation mode can be set as the image pick-up mode. Accordingly, by manipulating this mode change-over switch 206, the contents of several operating and displaying equipments can be changed over into those suitable for each of the above-mentioned modes.

Further, the subdisplay part 105 can display various states and an image picked up by the camera portion 400. The second speaker part 106 and the status lamp part 108 are adapted to inform calling and mails by means of voice (including a buzzer) and vision. The option setting key part 107 includes manipulation keys for setting an optional function in accordance with any one of the modes which are set by means of the mode change-over switch 206. In this embodiment, the option setting key part 107 is composed of a pair of button switch with which an initially preset function can be set.

For example, in the telephone mode, a function of displaying a content of a mail on the subdisplay part 105 and a function of displaying a screen for confirming the other part for talking are set. Further, in the animation mode, a function of starting and stopping recording, and a video-recording setting menu screen are set, Further, in the still image mode, a function of image pick-up and a menu screen for several image pick-up settings are set. These functions allow a menu screen to be displayed on the main display part 102 in the first condition through the manipulation of the cursor shift key 223 in the first condition, and accordingly, a function in each mode can be set through the intermediary of the option setting key part 107 with reference to set images stored in this menu screen.

Thus, the mobile telephone 1 in this embodiment can pick up an image by the camera potion 400 in not only the first condition but also the second condition. Further, image pick-up can be made wlile an image to be picked up is displayed on the subdisplay part 105 even in the second condition similar to the first condition in which a picked-up image is displayed on the main display part 102, and accordingly, the image pick-up can be made while an object to be picked up is displayed for confirmation, thereby it is possible to reduce erroneous operation upon image pick-up. Further, in this image pick-up condition, the camera portion 400 provided in the coupling portion 300 can be optionally rotated so as to be directed to an object to be picked up, and accordingly, the motion of a hand which holds the portable phone for directing the camera portion 400 to an object to be picked up can be reduced even inn both first and second conditions thereby it is possible to reduce the burden upon the hand. Further, in this embodiment, with the provision of the mode change-over switch 206, the subdisplay part 105 itself can be selectively used in both telephone mode and camera mode (still image mode and animation mode), and accordingly, the number of components can be reduced so as to be economical. Similarly, the option setting key part 107 can be selectively used in both telephone mode and camera mode by means of the mode change-over switch 206. Further, this option setting key part 107 can optionally set any function, thereby it is possible to provide the user with a freedom for manipulation.

Figure 2:
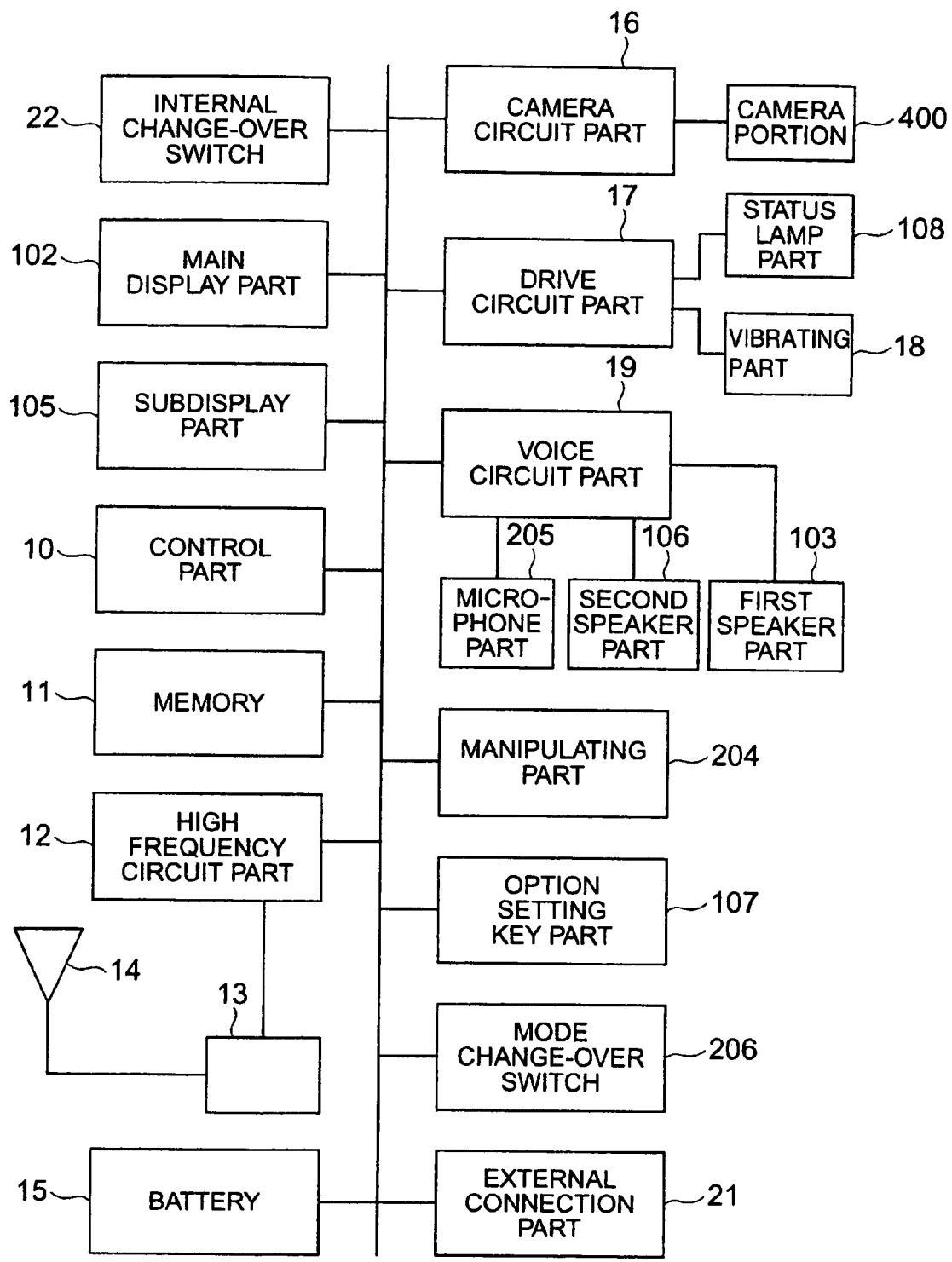
FIG. 2 is a block diagram illustrating the mobile telephone in the first embodiment of the present invention.

At first, referring to FIG. 2, explanation will be made of the configuration of the telephone 1. In FIG. 2, several devices and switches are connected to a control part 10 for integrally controlling the mobile telephone through the intermediary of a bus.

The internal change-over switch 22 is provided in the second housing 200, and transmits a signal in response to the opening and closing operation of the first casing 100. Several programs and data are stored in a memory 11, and accordingly, the control part 10 controls the mobile telephone 1 in accordance with a program. A high frequency circuit part 12 serves as a communication unit, and is connected to a main antenna 13 and a subantenna 14. A battery 15 supplies a power to the mobile telephone. The camera portion 400 is connected to a camera circuit part 16 through the intermediary of the bus.

A drive circuit part 17 is connected thereto with a vibration part 18 for producing vibration upon receipt of a message, and a status lamp part 108 for indicating a receipt of a mail, an alarm or a calling by means of alarm or light, and the operationg values and the operationg patterns thereof can be controlled under the control of the control part 10. Further, a voice circuit part 19 is connected thereto with the first speaker part 103, the microphone part 205 and the second speaker part 106.

Further, in this embodiment, there are provided the manipulating part 204, the option setting key part 107 and the mode change-over switch 206, and accordingly, with the use of the manipulation key switches and the like, the user can readily handle the mobile telephone 1. In addition, in this embodiment, there is provided an external connection part 21 through which the portable phone can be connected to an external unit such as a personal computer by way of a cable cord so as to carry out signal transmission and data exchange.

Next, explanation will be made of, the configurations of the components of the mobile telephone 1 with reference to FIGS. 3, 4 and 5.

Figure 3:
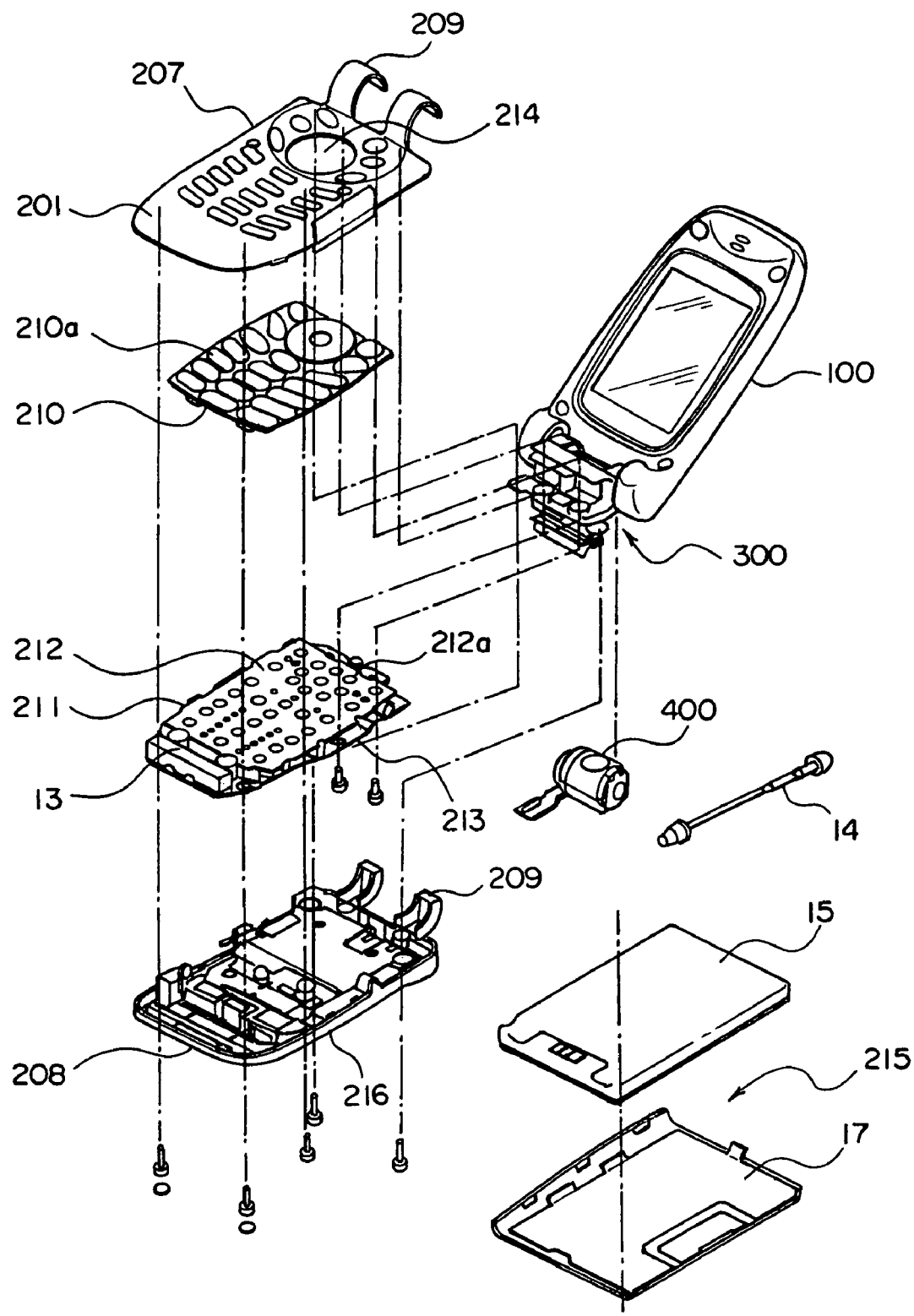
FIG. 3 is an exploded perspective view illustrating the mobile telephone in the first embodiment of the present invention.
Figure 4:
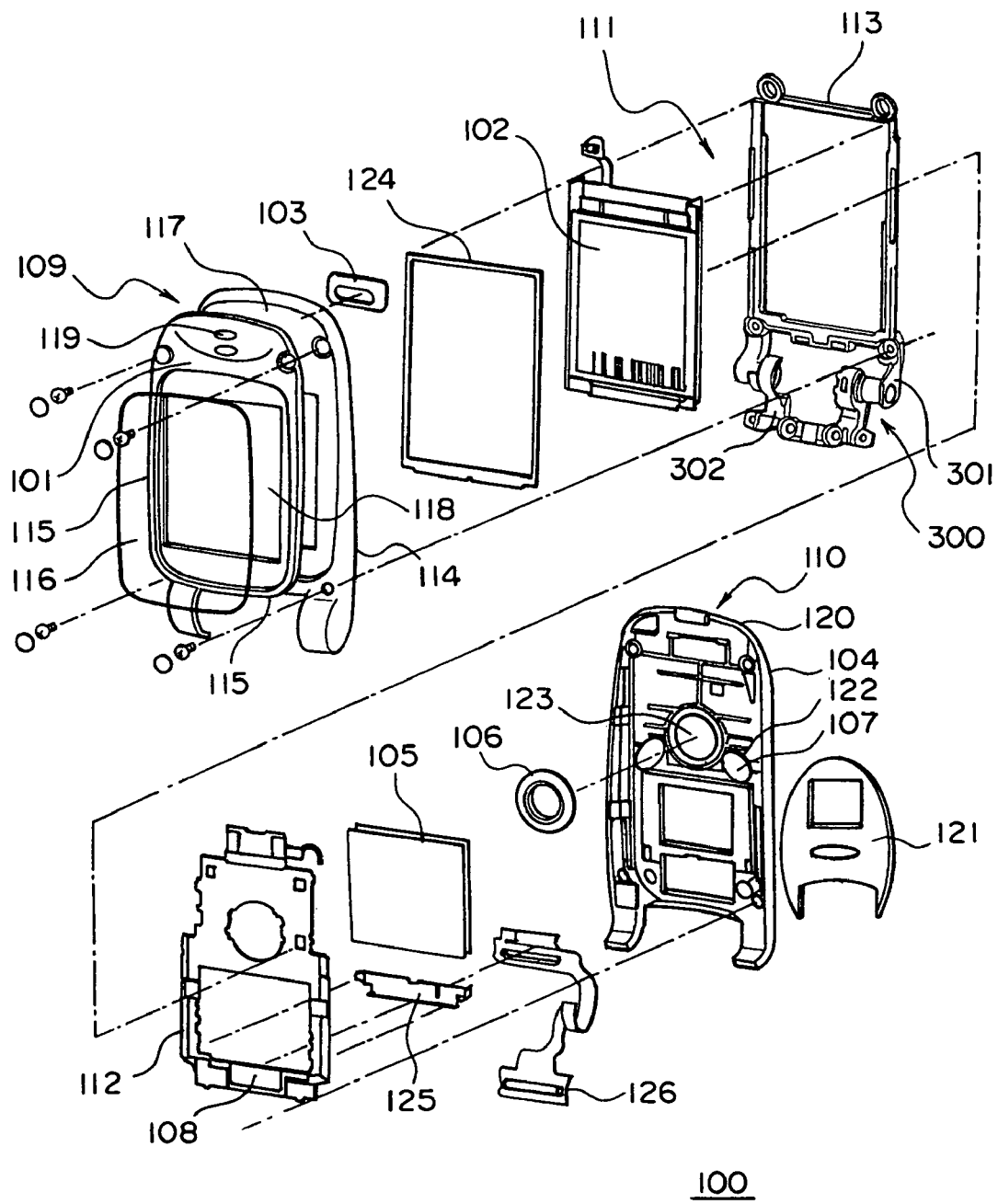
FIG. 4 is an exploded perspective view illustrating a first casing of the mobile telephone in the first embodiment of the present invention.

Referring to FIG. 3, as mentioned above, in this embodiment, the mobile telephone 1 is composed of the first casing 100 and the second casing 200, the coupling portion 300 for coupling the two casings so as to be openable and cloasable (foldable) with respect to each other, and the camera potion 400 rotatably mounted to the coupling portion 300.

The second casing 200 includes a second inner cover 207 which define the inner surface 201 thereof, and a second outer cover 208 for covering an outer surface of the second casing 200. These two covers are made of resin materials and are attached by means of screws. Further, these two covers incorporate, at their longitudinal one end, coupling covers 209 in pairs which cover the coupling portion 300 in order to satisfy authentic of the mobile telephone 1. Further, a key sheet 210 and a group 211 of internal devices are compactly covered with the second inner cover 207 and the second outer cover 208. The group 211 of devices includes a switch board 212, a control board 213, the main antenna 13 and the subantenna 14.

That is, in this embodiment, the switch board 212 and the control board 213 are arranged tandemly (vertically in the figure), and the key sheet 210 is located in front of the switch board 212 (thereabove in the figure). The key sheet 210 is made of a priable resin material, and is formed therein a plurality of protrusions 210a serving as manipulation buttons, in conformity with a plurality of apertures 214 formed in the second inner surface 201 of the second casing 200. Further, a plurality of contacts 212a are provided on the switch board 212, corresponding to these protrusions 210a. Accordingly, when the user depresses the protrusions 210a exposed from the apertures 214, the rear surface sides of the protrusions 210a presses the contacts 212a so as to manipulate the mobile telephone 1. Meanwhile, the control board 213 is composed of the control part 10 for integrally controlling the mobile telephone 1 and the high frequency circuit part 12 and the memory 11 which are mounted one or more of boards.

Further, the main antenna 13 is laid sidelong on the second casing 200 at the longitudinal other end (the end on the side remote from the coupling portion 300). This antenna 13 has a rod-like configuration so as to have a size which is smaller than the sum of thickness sizes or widths of the group 211 of devices and the key sheet 210. Thus, the second casing 200 may be tapered from its center to its one end part incorporating the antenna 13, and accordingly, the mobile telephone 1 can be readily introduced into a pocket, and can enhance the receiver sensitivity when it is gripped by one hand. Further, in this embodiment, the subantenna 14 which can enhance the receiver sensitivity when it is extended, is incorporated in the second casing 200 along the longitudinal direction of the latter, and accordingly, a satisfactory length can be ensured for the subantenna 14.

This outer cover 208 incoporats at its outer surface side a battery storage part 215 which consists of a recess part 216 formed in the outer surface of the second cover 208 over its entirety, and a battery cover 217 which is removably fitted in the recess part 216. With this configuration of the battery cover 217 receive therein the battery 15 of a thin card type can be accommodated in parallel with the control board 213, and accordingly, the casing can be thin and enhance the portability.

Next, the configuration of the first casing 100 will be explained with reference to FIG. 4. This first casing 100 is composed of a first cover 109 which defines the inner surface 101 of the first casing 100, and a first outer cover 110 which deines the outer surface 104 of the first casing 100, and a main chassis 113. These two covers 110, 112 are made of resin materials and are attached to the main chassis 113 by means of secrews.

Further a first group 111 of devices is mounted in a space defined between the two covers. The first group of devices is composed of a subcontrol board 112, the main display part 102, the subdisplay part 105, a second speaker part 106, the option setting key part 107, the status lamp part 108, the first speaker part 103 and the like.

As shown in FIG. 5, the main chassis 113 is made of a lightweight metal material such as magnesium alloy so as to be strong, and is formed at a longitudinal one end thereof with the coupling portion 300 made of a material similar to that of the main chassis 113. The coupling portion 300 is composed of first coupling parts 301 integrally incorporated with the main chassis 113, and a second coupling part 302 which is coupled to the first coupling part so as to be rotatable (flodable) therewith. The first and second coupling parts respectively incorporate pairs of arm parts 301a, 302a.

That is, the pair of first coupling parts 301 are formed thereto with the arm parts 301a which are extended from both sides of the chassis 113 to the longitudinal one side. The pair of arm parts 301a overhanging from both sides of the main chassis 113 are formed with rotary shafts 303, respectively, on the inside thereof, and the pair of arm parts 302a of the second coupling parts 302 are rotatably fitted at its one end on the pair of rotary shafts 303. Meanwhile, the pair of arm parts 302a of the second coupling part 302 are formed at its the other end side with an attaching part 304 for attachment to the second casing 200. Thus, by attaching the attaching parts 304 to the second casing 200 with screws or the like, the first casing 100 and the second casing 200 can be rotatably (foldably) coupled to each other.

Further, the rotary shafts 303 with which the first coupling parts 301 and the second coupling part 302 are rotatably coupled with each other, are mounted overhanging from the first casing 100 and the second casing 200, and the overhanging parts are covered with coupling covers 209 which exhibit an external appearance. Thus, since the first casing 100 and the second casing 200 are continuously formed in view of its external appearance, it is possible to materialize a coupling configuration which satisfies the portability and the handing even in both first and second conditions. Further, this rotary shafts 303 may be incoporated therein with springs which are not shown, or may be formed in its fitting surfaces with fitting grooves which are not shown, in order to maintain the first or second condition.

Meanwhile, in this embodiment, the coupling configuration composed of the pairs of arm parts 301a, 302a allows the coupling portion 300 to define in its center part a device storage space 305 in which the cameral portion 400 is received. Since the rotary shafts 303 are arranged on both sides of this device storage space 305, the cameral portion 400 incorporating on both sides thereof rotary mechanisms 401 coaxial with the rotary shafts 303 can be located in the device storage space 204.

Since the axes 303a of the rotary shafts 303 are laid orthogonal to the longitudinal direction of the rotary shaft 303, by arranging the camera portion 400 which is rotatable coaxial with the rotary shafts 303, the camera portion 400 can be rotated vertically when the mobile telephone 1 is gripped by the one hand, and accordingly, the view angle of the camera portion 400 can be optionally adjusted without unnecessary burden upon the hands. Further, with this configuration, since the camera portion 400 can be arranged between the pair of strong components of the coupling portion 300, and accordingly, the cameral portion 400 can be protected by the coupling portion 300. Further, in this embodiment, the camera portion 400 can be set within the projected area of the external shape of the coupling cover 209 which covers the coupling portion 300, as viewed at one lateral side (as viewed in the direction of the axis 303a of the rotary shaft 303), and accordingly, the effect of protection of the cameral portion 400 is further enhanced. Further, in this embodiment, the camera portion 400 is supported on its both sides by the pair of components of the second coupling parts 302, thereby it is possible to obtain a satisfactory rotational performance for the camera portion 400.

Further, the camera portion 400 incorporate signal lines 402 in one of the rotary mechanisms 410, which are wired to the control board 213, after passing through the arm part 302a. Further, the camera portion 400 is fitted so as to be rotatable within a predetermined operating range as will be explained later. Thus, the signal lines 402 can be restrained from being broken. Further, the rotary mechanisms 401 are formed therein with fixing grooves at their rotary surfaces so as to be fixed at its arbitrary angle. Thus, the view angle of the camera portion can be fixed at an optional position.

Referring again to FIG. 4, the first inner cover 109 is composed of a first main inner cover 114 which is a main structural member, a front panel 115 constituting the front surface of this main inner cover 114, and a transparent panel 116 for covering the front surface of the main display part 102. This front panel 115 is fitted in a recess part 117 formed in the front surface of the first main inner cover 114 by means of screws. It is noted that these screws are covered with rubber covers which serve as buffer members for preventing direct contact between the first casing 100 and the second casing 200 which damages them.

With the configuration, the front panel 115 which occupies a substantially entire area of the front surface of the first main inner cover 114 can be simply changed in its color or its material, and accordingly, wide variation in types of the mobile telephone can be obtained without substantial design change. A sound issue hole 119 for the first speaker part 103 is formed in one end part of the front panel 115 on the side remote from the coupling portion 300, and an opening part 118 for the main display part is formed on the coupling portion side thereof. The opening part 118 for the main display part is formed in its peripheral part thereof with a recess part in which the transparent panel 116 is fitted with an adhesive or the like.

Meanwhile, the first outer cover 110 is composed of the first main cover 120 which is a main structural body, and the outer panel 121 which constitutes a part of the front surface of the first main cover 120. In this embodiment, the outer panel 121 is made of a transparent resin material, and the first outer cover 120 is painted over all surface thereof including the inner surface, except of parts corresponding to the subdisplay part 105 and the status lamp part 108. With this configuration, it is possible to easily and variously change designing exhibiting with transparency. Further, the transparent panel which is provided for protecting the subdisplay part 105 is normally integrally incorporated with the outer panel 121, and accordingly, the number of required components can be decreased while the assembling ability and the esthetic can be enhanced. It is noted that although the transparent panel 116 is integrally incorporated with the outer panel 121 in this embodiment, the transparent panel 116 may be provided, independent from the outer panel 121 as is the front panel 115. On the contrary, the structure of the front panel 115 may be integrally incorporated as is the outer panel 121.

Further, the first main cover 120 is formed therein with an aperture part 122 for exposing the pair of option setting key part 107 and a sound issue hole 123 for the second speaker part 106. In this embodiment, the main display part 102 is fitted to the front side of the main chassis 113 through the intermediary of a holding frame 124, and the first speaker part 103 is attached thereto while the subcontrol panel 112 is attached to the rear side of the main chassis 113. Further, the subcontrol board 112 is attached thereto with the subdisplay part 105 through the intermediary of a holding panel 126, and also with the second speaker part 106 and the status lamp 108. This subcontrol board 112 is provided at its rear surface side with contacts corresponding to the option setting key parts 107, when the option setting key parts 107 are depressed, a signal is transmitted.

The main display part 102 and the first speaker part 103 are wired to the subcontrol board 112. Further, this subcontrol panel 112 is connected to the control board 213 through the intermediary of a band-like cord 126 which is wired through the coupling portion 300. Thus, in this embodiment, the signal lines from the cameral portion 400 are wired through one of the components of the coupling portions 300, and the band-like cord 126 is connected through the other one of the component of the coupling portion 300, thereby it is possible to facilitate the wiring.

Next, the external appearance of the mobile telephone 1 with reference to FIGS. 6a to 6e and FIGS. 7a and 7b. At first, with reference to FIGS. 6a to 6e, the external appearance in the second condition will be explained. This mobile telephone 1 has a maximum width W (around the subdisplay part 105) of 50 mm, a height H of 100 mm and a maximum thickness D (depth) of 26 mm in the second condition, and accordingly, it can be easily held on the palm of one hand, and can be readily introduced into a pocket.

Figure 6A:
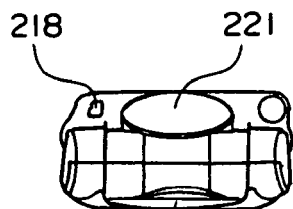
Figure 6B:
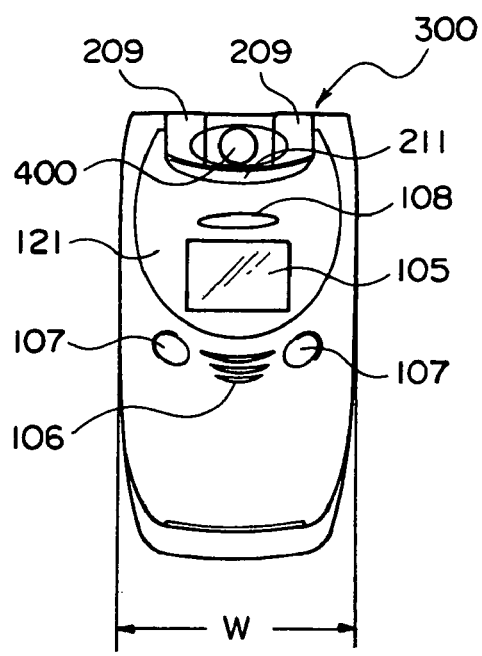

This mobile telephone 1 can be set to confront the user in the second condition as shown in FIG. 6b after the first casing 100 is folded forward while the second casing 200 is gripped in one hand. In this second condition, the coupling portion 300 is located in the uppermost part 300, and therebelow, the status lamp part 108, the subdisplay part 105 and the pair of the option setting key parts 107 between which the second speaker part 106 is interposed horizontally, are successively arranged downward in an mentioned order. These manipulation and display parts are arranged being biased toward one side as shown in FIG. 6b. Thus, the user who grips the mobile telephone 1 by his one hand, can surely hold the mobile telephone 1 without deteriorating the manipulation and the visibility of the above-mentioned manipulation and display parts.

Namely, in this embodiment, the camera portion 400 is located in the center part of the uppermost coupling portion 300 while the subdisplay part 105 is located just below and adjacent to the camera portion 400 with the status lamp part 105 intervening therebetween. Thus, as shown in, for example, FIG. 6b, even though a self-portrait of the user confronting the front surface of the camera portion 400 can be picked up, and is then checked, such a deficiency that the user's gaze line deviates can be reduced since the camera portion 400 and the subdisplay part 105 are vertically arranged adjacent to each other.

Further, since the status lamp part 108 is located at the center of the upper part of the mobile telephone 1, its visibility is satisfactory even though it is gripped in one hand. Further, even in view of the aesthetic, the camera portion 400 and the subdisplay part 105 are zoned as a visual group from the other manipulation and display parts by the outer panel 121, thereby it is possible to provide such a configuration that the function and the designing are well-harmonized.

Further, since the camera portion 400 is located at the upper end of the mobile telephone 1, the upper end part thereof is exposed in the upper end part in the second condition, the thus exposed part can be rubbed by one hand, and accordingly the camera portion 400 can be simply turned so as to adjust the view angle of the camera portion 400.

Further, since the camera portion 400 is formed so that the upper end thereof (refer to the upper end part of FIG. 6) is lower than the coupling covers 209 on both sides, it is in conformity with the bulge of a finger, thereby it is possible to exhibit satisfactory operational feeling. Further, this lower configuration allows the camera portion 400 to be protected. Moreover, the rear surface of the camera portion 400 which faces a surface incorporating a lens part of the camera portion 400 is negatively arcuated, as viewed from the above, as shown in FIG. 6a, and is accordingly narrower than the coupling covers 209 on both sides, and accordingly, the protection of the camera portion 400 can be further enhanced.

Further, the negatively arcuated part has such a shape (elliptic shape) that the coupling covers 209 and the camera portion 400 can be continuously contiguous with each other, and accordingly, the view angle of the camera portion 400 can be positionally adjusted to either to the front direction confronting the front face of the user or the opposite rear direction.

Meanwhile, the option setting key parts 107 are arranged around the center in FIG. 6b. In general, in the case of gripping the mobile telephone 1 in one hand in the second condition, the lower part thereof is held in the hand. In this gripped posture, since the position where the option setting key parts 107 are located, falls within the operational range by the tumb of the one hand holding the mobile telephone, the user can manipulate the mobile telephone 1 with his one hand. Moreover, the second speaker part 106 is located between the pair of the option setting key parts 107, and accordingly, erroneous operation can be reduced even blind manipulation is carried out. Further, with the arrangement of the option setting key parts 107, it is possible to prevent the visibility from being hindered by the tumb on manipulation.

Further, in this embodiment, the mode change-over switch 206 is provided in one side surface of the second casing 200 on one side of the subdisplay part 200 (refer to FIG. 7b). This position falls within the operational range by the thumb in the case of gripping the mobile telephone 1 by the left hand. Thus, the user can manipulate both mode change-over switch 206 and the option setting key parts 107 by his thumb, and accordingly, substantially all manipulations of the mobile telephone 1 can be carried out only by one hand.

Further, in this embodiment, an external connection part 21 covered thereover with a cap is incorporated in a surface (right side surface) of the second casing which opposed to the side surface incorporating the mode change-over switch 206. In general, a mobile telephone of this kind has been conventionally provided at its bottom surface of the second casing (refer to FIG. 6e in this embodiment) with the external connection part. However, in this conventional example, a cord connected thereto is led out toward the user, it is troublesome. Further, in connection, since the external connection part is located longitudinally of the mobile telephone 1, the user should change the posture of the mobile telephone 1 by a large degree. However, in this embodiment, since it is incorporated in one side surface, the changing of the posture can be facilitated, and even in connection, it can be simply manipulated, and further, since the cord can be led laterally, no hindrance by the cord is caused. Further, with the provision of the external connection part in the side surface, the external connection part 21 can be directly incorporated to the control board 213, and accordingly, the assembling ability and the wiring can be facilitated.

Further, in this embodiment, as shown in FIG. 6b, with the provision of the subantenna 14 in one side part of the rear surface of the second casing 200, the battery storage part 215 is provided being biased toward one side. With this arrangement, the battery storage part 215 and the subanttenna 14 can be arranged side by side, thereby it is possible to ensure a sufficient space for arranging a connector above the battery storage part 215. Thus, the external connection part 21 can be arranged in one side surface.

Figure 6C:
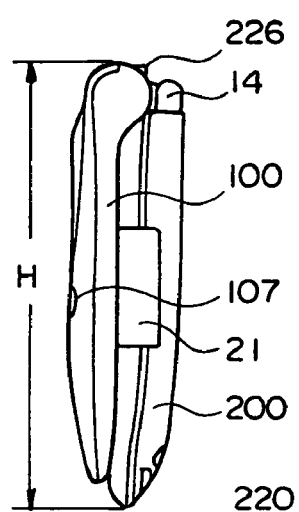

Meanwhile, in this embodiment, with the provision of the external connection part 21, the mode change-over switch 206 and the like in both side surfaces of the second casing 200, the main antenna 13 is incorporated in the bottom surface of the second casing 200. This main antenna 13 can have a forward tapered shape with a small bottom surface in comparison with the arrangement of the external connection part 21 in the bottom surface of the second casing 200 as in the conventional one. Thus, as shown in FIGS. 6b and 6c, the mobile telephone 1 can have such a shape that it is tapered from the center part to the bottom surface thereof, and accordingly, the holdability of the mobile telephone 1 can be satisfactory in conformity with the palm of the hand. Further, this configuration allows the mobile telephone 1 to be smoothly introduced in a pocket with such a posture that the coupling portion 300 is set at the upper position.

Further, in this configuration, the subantenna can be located along one side of the second housing 200. With this configuration, even though the mobile telephone is changed over from the first condition into the second condition, the subantennal 14 is held to be stationary at the upper position, irrespective of the motion of the first casing 100. In particular in the second condition, the option setting key parts 107 and the mode change-over switch 206 are manipulated so as to confirm the subdisplay part 105 or manipulate the camera portion 400 in this embodiment, and accordingly, should the subantenna 14 be provided in the first casing 100, the manipulatability of the second casing 200 would be greatly affected. However, since it is located at one side of the upper surface of the second casing 200 in this embodiment, it is possible to prevent the manipulatablity in the second condition 200 from being hindered, even through the subantenna 14 is extracted.

Figure 6D:
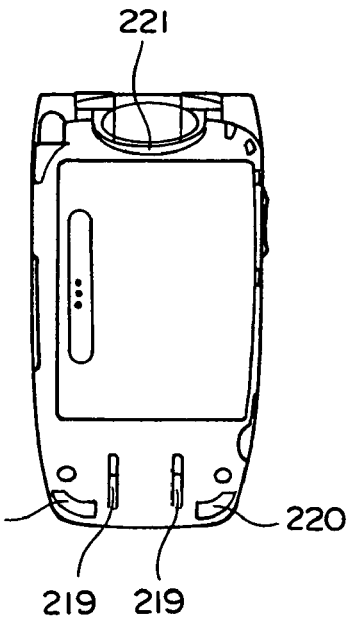
Figure 6E:
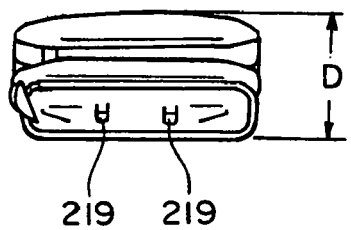
Figure 8:
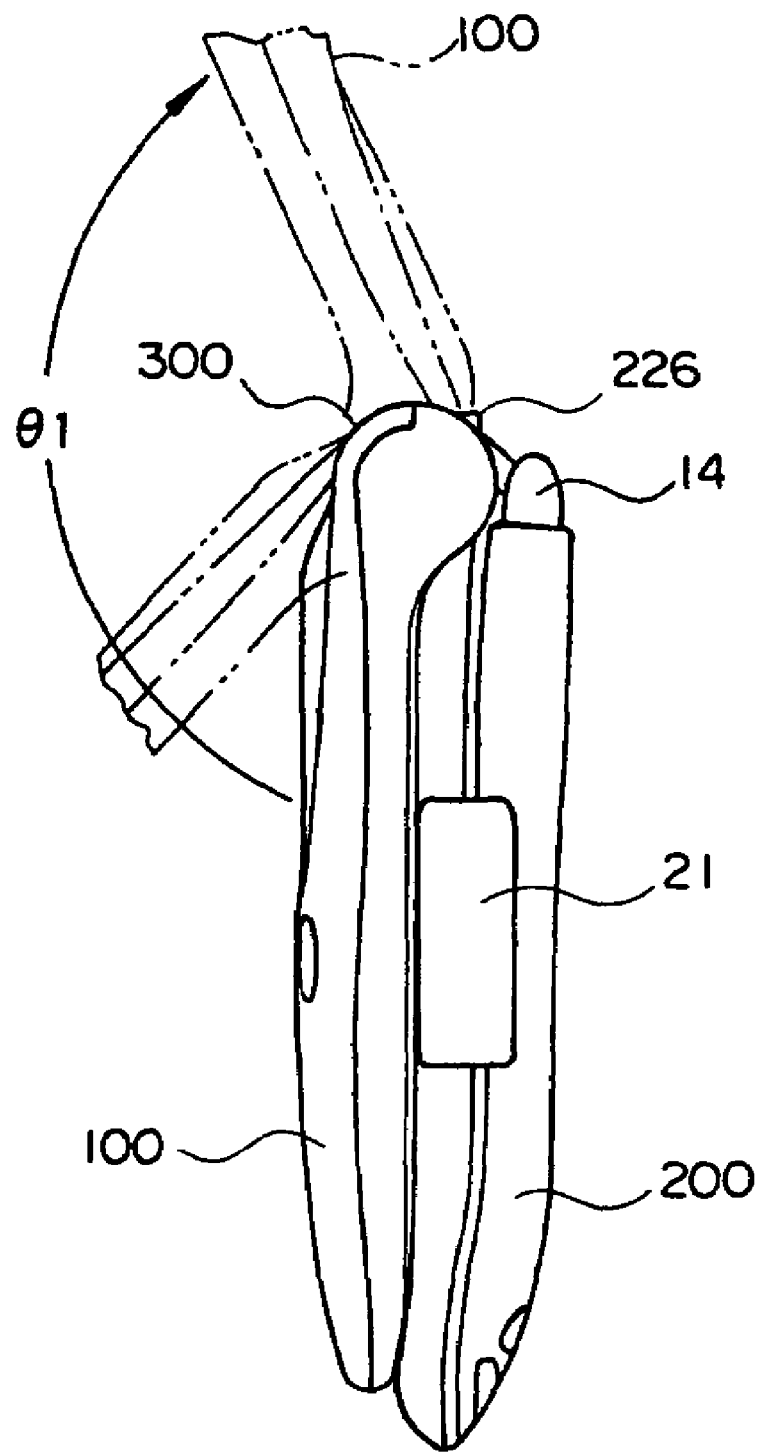
FIG. 8 is a right side view illustrating the first casing of the mobile telephone in the first embodiment of the present invention during opening and closing operation.

It is noted that there are shown in FIGS. 6a, 6d and 6e a strap attaching part 218, a charge terminal 219, a recess part 220 for positioning the mobile telephone on a charge stand. Further, there is shown in FIGS. 6a, 6b and 6d a cut-out 221 for obtaining a view angle of the camera portion 400 which will be explained in detail later with reference to FIG. 9.

Next, referring to FIGS. 7a and 7b, the external appearance in the first condition will be explained. This mobile telephone 1 has an overall length (height L) of 185 mm in the first condition, so as to be in conformity with the length from the mouth to an ear of the user, that is, its configuration can satisfy the holdability. This mobile telephone 1 can be set in the first condition in which the inner surface of 101 of the first casing 100 and the inner surface 201 of the second casing which are hidden in the second condition, are exposed so as to be effected the second condition by opening the first casing 100 upward after it is held by one hand. In this first condition, the camera portion 400 can be set in the longitudinally center part of the mobile telephone. Further, the main display part 102 is located in the first inner surface 101 above the camera portion 400, the manipulating part 204 is located in the second inner surface 201 below the camera portion.

In this configuration of the mobile telephone 1, the manipulating part 204 which is manipulated in the first condition is concentrically arranged in the second casing 200, and accordingly, the mobile telephone 1 can be manipulated and held by one hand since the manipulating part 204 can be manipulated by the thumb of the one hand which grips the second casting 200. Since the second casing 200 can be gripped by one hand, it can be stably held even though the manipulating part 204 which is located in the front surface (the second inner surface 201) of the second casing 200 is manipulated by the one hand. Further, since the camera portion 400 is located around the upper part of the manipulating part 204, it is possible to restrain the other hand on manipulation from obstructing the view angle of the camera portion 400. Further, even though the rotatable camera portion 400 is turned by the other hand, movement of the hand can be suppressed since the second casing 200 supporting the camera portion 400 is gripped by one hand.

Further, since the main display part 102 is located above the camera portion 400, the hand on manipulation is prevented from hindering the visibility of the main display part 102. Further, since the main display part 102 and the camera portion 400 are arranged adjacent to each other, and since the camera portion 400 is aligned with the laterally center part of the main display part 102, even though a self portrait is picked up by the camera portion 400, the gaze line onto the main display part 102 can be restrained from deviating.

Figure 9A:
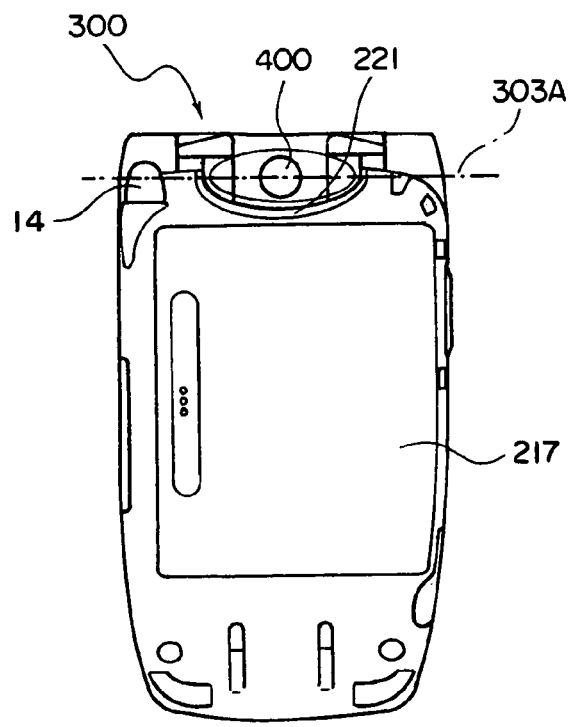
Figure 9B:
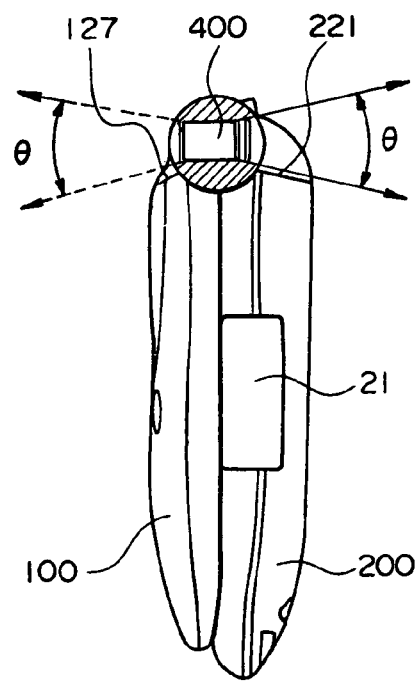

In addition, in this embodiment, since the camera portion is turned around the rotary shafts 303 as the center, as indicated by the dotted line in FIG. 9b, the camera portion 400 can be directed toward the user so as to pick up his self-portrait as indicated by the dotted line in FIG. 9b while it can be turned by an angle of 180 deg, so as to pick up an image of a landscape as indicted by the solid line in FIG. 9b. Further, the camera portion 400 can be, of course, is fixed at an arbitrary angle, preventing a unreasonable posture from being taken to adjust the view angle of the camera portion 400, a burden upon the one hand gripping the mobile telephone can be reduced. Further, since the camera portion 400 is formed in a size which is smaller than that of the coupling covers 209 therearound (that is, it falls in the projected area of the coupling parts 209 as views at their side surfaces), and accordingly, it is possible to restrain unintentional contact of the cameral with anything, thereby it is possible to reduce accidental motion of the camera portion 400 during image pickup.

The manipulating part 204 is composed of the enter key 222 located at its center, a cursor shift key 223 located around the former, the plurality of selection keys located around the cursor shift key 223, the ten keys 202 for entering numericals, letters or the like, and a power source (clear-down) key 227 located above the ten keys 202, a transmission key 228 and a clear (return) key 229. The cursor shift key 223 incorporates a ring-like manipulating surface which are inclined in eight directions so as to shift a cursor displayed on the main display part 102 in an inclined direction. With this cursor, operation a selected menu item can be carried out by the enter key 222.

Meanwhile, the selection keys consists of an internet key 224a, a mail key 224b and a pair of soft keys 224c, 224d which can set an optional function. The soft keys 224c, 224d are adapted to carry out operation corresponding to function display icons 241, 242 which have been previously set and displayed on the main display part 102 in the lower part of the latter. In another mode or in a lower hierachical layer, the function of the soft keys 2214c, 224d are set so as to carry out operation corresponding to the function display icons 241, 242 which have been previously set up and which are give in the lower part of a screen on the main display part 102. Further, there are provided the mode change-over switch 206, a manner mode setting key 225 and an ear phone jack (with a cover) 226 in the side surfaces of the second casing 200.

In this embodiment, since the manipulating group is arranged within an operational range by the thumb of the one hand which grips the mobile telephone 1, the mobile telephone 1 can be manipulated by one hand which holds the mobile telephone 1. Further, by manipulating the internet key 224, the mail key 224b, the ten keys 202 and the like, there may be carried out several operations and input manipulations including talking, mailing and internet, displaying of a address list, displaying of an image section and enjoying of a music and the like. Further, referring to FIG. 8, in this embodiment, the opening angle ⌴of the first casing 100 with respect to the second casing 200 is set in a range from 160 to 170 deg. Thus, since the first condition is held in such a posture that the first casing 100 and the second casing 200 are angled around the coupling portion 300, the microphone 205 and the first speaker part 103 can be held in conformity with the mouth and an ear of the user during taking. Further, in this angle configuration, even through the subantenna 14 is extended, the subantenna 14 is prevented from limiting the motion of the first casing 100.

Further, in this embodiment, pairs of protrusions 226 for stopping the motion of the first casing 100 are incorporated on the rear surface side of the coupling covers 226, and further, since they are located on both sides of the pair of coupling covers 226, the camera portion 400 provided inside thereof can be protected thereby.

Referring to FIGS. 9a and 9b, in this configuration, the camera portion 400 is rotatably provided in the coupling portion 300, and accordingly, a content picked up by the camera portion 400 can be processed while it is confirmed even in either the first condition or the second condition. Further, in this embodiment, since the camera portion 400 is accommodated in the pair of components of the coupling portion 300, the mobile telephone 1 can be formed in a compact shape in its entirety. However, should the cameral portion 400 be accommodated within the coupling portion 300, a part of the casing would fall in the range of the view angle ⌴of the camera portion 400. For example, as shown in FIGS. 9a and 9b, in this embodiment, the camera portion 400 having a pick-up range in which the view angle extend circularly in its section is utilized. Should such a camera portion 400 be rotated around the axis 303 in alignment with the rotary shafts 303 of the coupling portion 300, the folded casings would fall in the range of the view angle of the cameral portion 400. In particular, in this arrangement, since the camera portion 400 can be rotated over an angle of 180 deg., and accordingly, the possibility of pick-up of an image of a part of the first casing 100 or the second casing 200 would become higher.

This pick-up problem can be solved by locating the lend part of the camera portion 400 at the front surface of the second casing 200 or in front thereof. However, with such solving measures, the small-sized camera portion 400 would be largely handled, it would cause the mobile telephone to have a low packaging density but a large size. In particular, in this embodiment, since the camera portion 400 is included within the projected area of the coupling covers 209, this problem is serious. In the conventional example, since the image pick-up can be made only in the first condition, no above-mentioned problem has been caused, but this problem would be serious in this embodiment.

In order to solve this problem in this embodiment, the arcuated cut-out parts (planar cut) 127, 221 are formed in the end parts of the first casing 100 and the second casing 200 which are adjacent to the camera portion 400. These cut-out parts 127, 221 are formed to be arcuated around the lens part of the camera portion 400 as a center so as to just define the range (conical shape) of the view angle of the camera portion 400. Further, in this embodiment, as shown in FIG. 9b, the thickness of the second casing 200 is larger than that of the first casing 100 in view of the components packaged in the second casing, and accordingly, the cut-out part 221 in the second casing 200 has a depth which is greater than that of the cut-out part 127 in the first casing 100.

Further, in this embodiment, since the camera portion 400 is turned around the axis 303a aligned with the rotary shafts of the coupling portion 300, an image displayed on the main display part 102 is vertically inverted when it is turned by an angle of 180 deg. Thus, in this embodiment, a predetermined angle is detected by a sensor which is provided in the coupling portion 300 and which is not shown, and accordingly, the control part 10 carries out such control that the content of the display is vertically inverted at this predetermined angle.

Figure 10A:
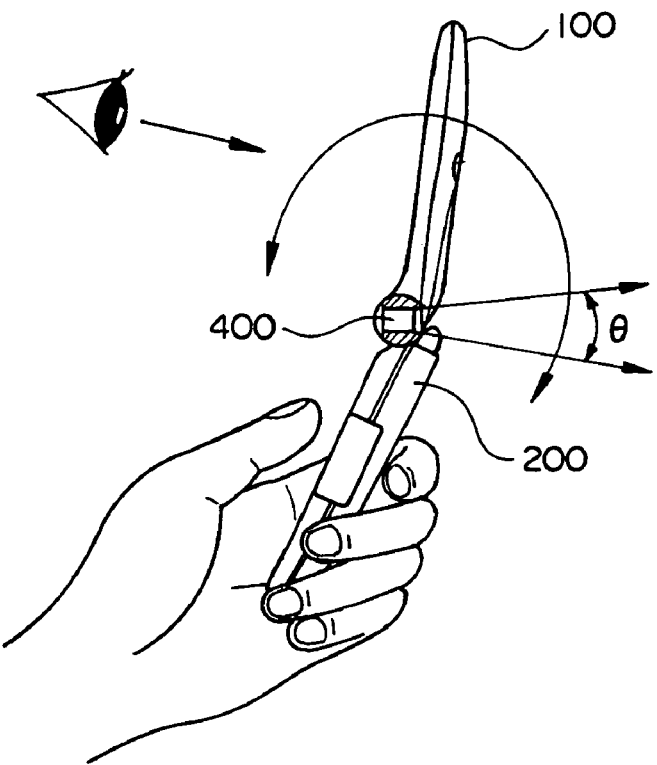

Referring to FIGS. 1, 6a to 6c, 7a and 7b and 10a and 10b, explanation will be hereinbelow made of the way of using this mobile telephone 1. As shown in FIGS. 7a and 10a, in this mobile telephone 1, when the power source key 227 is depressed in a condition in which the first casing 100 is opened so as to turn on the mobile telephone, the control part 10 operates the mobile telephone 1 in a talk mode which has been initially set, that is, the telephone function is set in a standby state. In this standby state, the telephone function is dominant, and accordingly, the manipulation group and the display contents are set in the telephone function.

For example, in the first condition, wallpaper set by the user is displayed on the main display part 102 while a radio wave condition, the presence of calling of a mail and the data are indicated on the status display part 102a provided above the upper part of the main display part 102. It is noted that the indication of the date may be displayed in the main display part 102 as is optionally set by the user. In the case of indication of the date on the main display part 102, it is displayed being superposed with the background. In this standby state, when telephone calling is received, calling sound is issued from the second speaker part 106, and a telephone number or the like for the other party is displayed on the main display part 102. Further, in this standby state, the menu screen is displayed through the manipulation of the cursor shift key 223, the decision key 222, the internet key 224a, the mail key 224b and the like, and accordingly, changing of various set values, internet connection and mail transmission can be made. Further, the function display icons 241, 242 are displayed in the lower part of the main display part 102, and the soft keys 224c, 224d can be manipulated corresponding to functions indicated by the function display icons 241, 242.

Meanwhile, when the first casing 100 is folded in the first condition so that it is shifted from the first condition into the second condition, the control part 10 detects a status change of the casings in response to the internal change-over switch 22, and the main display part 102 which has been turned on in the first condition is turned off, the subdisplay part 105 and the option setting key parts 107 which are provided in the outer surface of the first casing 100 and which have been deenergized in the first condition are set to be operative. It is noted that the second speaker part 106 may be set to be operative even either of both first and second conditions.

In this embodiment, the standby state of the telephone mode has been set as initial setting in the second condition. Accordingly, in a normal state, a radio wave condition, the presence of receipt of a mail, the date and the like are displayed on the subdisplay part 105. In this state, when telephone calling or a mail is received, receiving sound in accordance with a setting by the user is issued from the second speaker part 106, and the receiving is indicated by the subdisplay part 105 or the status lamp part 108. Further, in this telephone mode, when the option setting key parts 107 are manipulated, a function set by the option setting keys 107 can be carried out.

It is noted that in the case of execution of the camera function which is a main feature of the present invention, the mode change-over switch 205 is manipulated. The control part 10 energizes the camera portion 400 so that the later becomes operative, and a display screen which is not shown in the animation mode or the still picture mode is displayed on the subdisplay part 105.

For example, in the first condition, the content picked up by the camera portion 400 is displayed on the main display part 102. Three function indicating icons 241, 242, 243 are displayed in the lower part of the display screen on the main display part 102 as shown in FIG. 7a, and an image pick-up staring and ending icon at the center, and a video recording setting menu indicating icons on both sides are displayed. These three icons 241, 242, 243 are displayed corresponding to the enter key 222 and the soft keys 224c, 224d, respectively, and accordingly for example, the video recording setting menu icon at the center and the return icon on both sides carry out the functions by depressing the enter key 222 and the soft keys 224c, 224d, respectively. With this configuration, the user can pick up an image without erroneous operation.

Accordingly, the user can carry out an image pick-up by the camera portion by depressing the enter key 222 in such a condition that a display screen in the animation mode or the still image mode is displayed. This camera portion 400 can be turned as stated above, and accordingly, by directing the lens part toward the user, a self portrait can be picked up while by turning by an angle of 180 deg. an image from a landscape can be picked up.

For example, referring to FIG. 10 which schematically shows a one hand manipulation by the left hand, the user can grip the second casing 200 with the palm and four fingers of his left hand while he manipulates the cursor shift key 223, the enter key 222, the ten keys 202 and the like. In this condition, the view angle ⌷of the camera portion 400 is set so as to direct the lens part toward an object to be picked up, an image picked-up can be made while the content of the picked up image is confimed on the main display part 102. The content of the picked-up image can be processed in several manners by displaying an editing screen through manipulation of the cursor shift key 223 or the like. Naturally, since the camera portion 100 can be turned, it is inverted, and a self-portrait can be picked up while the self portrait is displayed on the main display part 102.

Meanwhile, in the second condition, the content of an image picked up by the camera portion 400 is displayed on the subdisplay part 105. Function display icons (which are not shown) which have been set corresponding to the option setting key parts 107 are provided in a display screen displayed on the subdisplay part 105 in the lower part thereof. The user can pick up image while a picked-up image screen is displayed on the subdisplay part 102 without erroneous operation, by manipulating the option key setting parts 107 while he observes the function indicating icons.

Accordingly, the user can pick up an image by depressing the option setting key parts 107 in such a condition that a display screen in the animation mode or the still image mode is displayed. Since this camera portion 400 can be turned as stated above, a self portrait can be picked up by directing the lens part toward the user, but an image from a landscape can be picked up by turning over an angle of 180 deg.

Figure 10B:
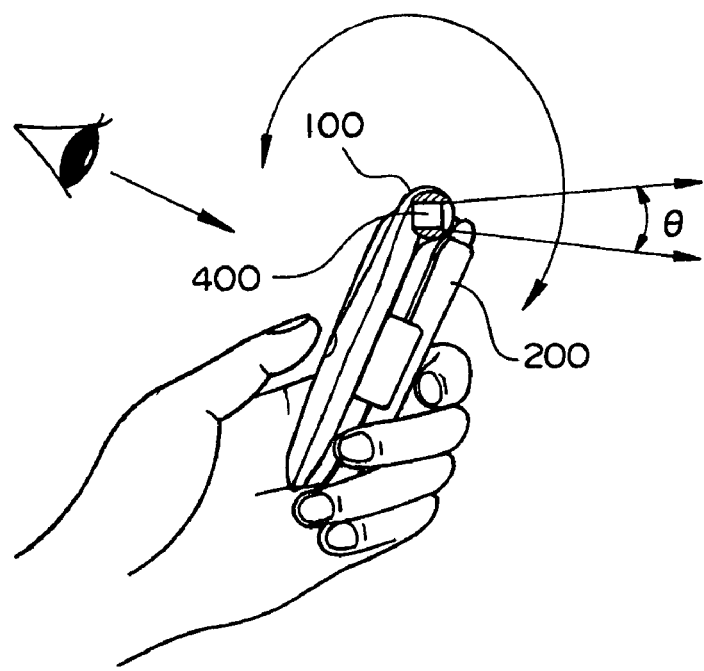

For example, FIG. 10b schematically shows a one hand operation by a left hand. The user can grip the second casing 200 with the palm and four fingers of his left hand while the option setting key parts 107 are manipulated by the thumb thereof. In this condition, by setting the view angle ⌷of the camera portion 400 so as to direct the lens part toward an object to be picked up, the image can be picked up while the content thereof is confirmed on the subdisplay part 105. Naturally, since the camera portion 400 can be turned, if it is inverted, a self-portrait can be picked up while it is confirmed on the main display part 102. It is noted that the content of the picked-up image can be variously processed by displaying an editing screen through manipulation of the cursor shift keys 223 or the like in the first condition.

Thus, in this embodiment, the mobile telephone 1 can be handled with the same holding posture and the same manipulating posture even either the first condition or the second condition.

It is noted that in this embodiment, although the turning motion of the coupling portion 400 is set in a range from 0 to 180 deg., the present invention should not be limited to this range. For example, in the second condition, by turning the camera portion 400 by an angle exceeding 180 deg., while the lens part is prevented from being exposed from the casing, it is possible to prevent the lens part from being broken or damaged.

Second Embodiment

Next, referring to FIGS. 11a and 11b and FIG. 12, a second embodiment of the present invention will be explained. It is noted that like reference numerals are used to denote like parts and arrows to those in the first embodiment.

In a mobile telephone 2 in this embodiment, the distinct feature thereof is the provision of such a configuration that a coupling portion 350 coupling the first casing 100 with the second casing 200 in an openable and closable manner is biased toward one side, and a camera portion 410 rotatably attached in the coupling part 350 is provided on the other side. Referring to FIG. 11b, in this embodiment, the main display part 102 is provided in the inner surface 101 of the first casing 100 which is hidden in the second condition, a touch panel display part 250 is provided in the inner surface 201 of the second casing 200 which is hidden in the second condition. Further, a first speaker part 103 and a microphone part 205 are arranged respectively in the two inner surfaces on the side remote from the coupling portion 350.

Meanwhile, a subdisplay part 105, a second speaker part 106, a pair of option setting key parts 107 and a status part 105 are arranged in the outer surface 104 of the first casing 104 on the side opposed to the inner surface 101 of the first casing 100. Accordingly, even in this second embodiment, similar to the first embodiment, an image can be picked up while the content of the picked-up image is confirmed even either the first condition or the second condition.

Further, in this embodiment, the subantenna 14 is provided at the outer surface 104 of the first casing 100. This subantenna 14 overhangs from the center of the end part, and accordingly, the subantennal 14 is located at the uppermost part in the fisrt condition, thereby it is possible to satisfy the sensitivity.

Further, referring to FIG. 12, the coupling portion 350 is composed of a first coupling cover 351 overhanging from the first casing 100, and a second coupling cover 352 overhanging from the second casing 200. These two coupling covers 351 and 352 are provided therein respectively with coupling mechanisms which are not shown. One of the two coupling covers 351, 352, that is, for example, the first coupling cover 351 in this embodiment is formed continuously with a side surface of the first casing 100 on one side.

Meanwhile, the other one of the coupling covers, for example, the second coupling cover 352 in this embodiment is formed near to the center part more or less. These two coupling covers 351, 352 couple the first casing 100 and the second casing 200 with each other in an openable and closable manner around an axis 353A as a center through the intermediary of the rotary shaft 353.

With this configuration of this embodiment, the coupling portion 350 is centrally arranged on one side, a large camera storage space 354 can be formed on the other side. Further, a rotary shaft 355 for the camera portion 410 is provided on one side of the second coupling cover 352. Namely, the rotary shaft 353 and the rotary shaft 355 are arranged opposed to each other on both sides of the second cover part 352, and the axes 353a of both rotary shafts 353, 255 are aligned with each other.

The camera portion 410 has the rotary shaft 355 on one side, and a lens part 410a is arranged on the rotary shaft side, and a light source (flusher) 412 is located on the other side. Since the camera portion 410 is rotated around only one side rotary shaft, by arranging the lens part 412 on the rotary shaft side, the lens part 412 can be set around the crosswise center of the mobile telephone 2. Meanwhile, since the camera portion is supported by a cantilever-like manner, it is not required to arrange a coupling mechanism on the open side, and accordingly, the light source 412 can be arranged in this space. In this embodiment, an LED light source having a less power consumption is used as the light source, and accordingly, an image pick-up with a less light source is effective.

In this embodiment, there may be obtained technical effects and advantages which are similar to these obtained in the first embodiment, and further, the light source 412 can be arranged with the use of the large camera storage part 354. Further, with the provision of the display part 250 incorporating the above-mentioned touch panel, several manipulation switches are displayed on the display pat 250 with the touch panel, and accordingly, by touching the switches, the manipulation can be comfortably carried out.

According to the present invention, there can be provided a mobile telephone with which an image pick-up by a camera portion is facilitated with no affection by folding operation of the casings.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A mobile telephone comprising:
a body housing which includes:
a first casing, and
a second casing which is coupled to said first casing by a coupling portion to permit opening and closing of said first and second casing relative to each other;
a camera portion mounted to said body housing;
a mode change-over switch for changing over between a talk mode and an image pick-up mode; and
a setting key,
wherein said first and second casings which are coupled to each other through said coupling portion being set in two conditions, wherein a first condition is when the first casing and the second casing are opened relative to each other, and a second condition is when the first casing and the second casing are closed relative to each other,
wherein said first casing incorporates a main display part in a surface thereof which is exposed when said first and second casings are in said first condition and is hidden when said first and second casings are in said second condition, and a sub-display part in a surface thereof which is exposed when said first and second casings are in either said first condition or said second condition,
wherein said second casing incorporates a manipulating part in a surface thereof that is exposed when said first and second casings are in said first condition and is hidden when said first and second casings are in said second condition,
wherein said mode change-over switch is incorporated in a surface of the housing body and is exposed when said first and second casings are in both said first and second conditions,
wherein said coupling portion incorporates a rotary shaft which couples said first and second casing to be foldable,
wherein said camera portion is rotatably connected to said coupling part, coaxially with the rotary shaft,
wherein an image picked up by said camera portion in the image pick-up mode is displayed on said main display part when said first and second casings are in said first condition and displayed on said sub-display part when said first and second casings are in said second condition, and
wherein said setting key is arranged in a surface of the housing body to be exposed when said first and second casings are in either of said first and second conditions and is adapted to be set to an image pick-up manipulating key in the image pick-up mode.

2. A mobile telephone as set forth in claim 1, wherein said camera porition is rotatably connected to the coupling portion at a center thereof along an axis of the rotary shaft.

3. A mobile telephone as set forth in claim 1, wherein said mode change-over switch is arranged in a side surface of the second casing.

4. A mobile telephone as set forth in claim 1, wherein said coupling portion incorporates a sensor for detecting a rotating angle of the camera portion, and in the image pick-up mode, an image picked up by the camera portion and displayed on the main display part is vertically reversed in response to a predetermined rotating angle of the camera portion detected by the sensor.

* * * * *